United States Patent [19]

Ellsworth et al.

[11] Patent Number: 5,106,130
[45] Date of Patent: Apr. 21, 1992

[54] COMPOSITE THREAD COUPLING FOR REINFORCED PIPE

[75] Inventors: Phillip G. Ellsworth; Gregory D. Bauer, both of Wichita, Kans.

[73] Assignee: A. O. Smith Corporation, Milwaukee, Wis.

[21] Appl. No.: 728,778

[22] Filed: Jul. 8, 1991

Related U.S. Application Data

[63] Continuation of Ser. No. 426,052, Oct. 24, 1989, abandoned, which is a continuation of Ser. No. 357,031, May 25, 1989, abandoned, which is a continuation of Ser. No. 212,599, Jun. 28, 1988, abandoned.

[51] Int. Cl.$^5$ .............................................. F16L 15/04
[52] U.S. Cl. ................................. 285/355; 285/423; 285/92; 285/919
[58] Field of Search ............... 285/355, 423, 333, 919, 285/923, 390, 334, 909, 351, 92

[56] References Cited

U.S. PATENT DOCUMENTS

| | | | |
|---|---|---|---|
| 2,751,237 | 6/1956 | Conley | 285/423 |
| 2,843,153 | 7/1958 | Young | 285/423 |
| 3,101,207 | 8/1963 | Pavel et al. | 285/355 |
| 3,366,504 | 1/1968 | Hulterstrum | 285/355 |
| 4,589,187 | 5/1986 | Stone et al. | 285/334 |

Primary Examiner—Eric K. Nicholson
Attorney, Agent, or Firm—Niro, Scavone, Haller & Niro

[57] ABSTRACT

A pipe joint is provided wherein mating female and male threads are ground or scribed into the ends of the pipes to be joined. At least one of the scribed threads has a paste thread contact molded onto it so that the valley of the contact molded thread is below the crest of the scribed thread. Upon mating of the coupled pipe ends, the contact molded thread surface provides a smooth finish and a relatively low, consistent engagement and disengagement torque. The overlapped crests of the scribed male and female threads provide for mechanical interlock and correspondingly enhanced tensile strength in the joint. The invention is particularly suited to pipes made of resin reinforced with wound filaments, where the scribed threads can be cut shallowly to retain the strength of the body of the pipe and minimize cutting of the wound filaments. In that application, use of the same resin in the pipe material and the contact molded threads eliminates problems with differential thermal expansion in response to temperature changes.

6 Claims, 2 Drawing Sheets

COMPOSITE THREAD COUPLING FOR REINFORCED PIPE

This is a continuation of copending application Ser. No. 426,052, filed on Oct. 24, 1989, which is a continuation of Ser. No. 357,031, filed May 25, 1989, which is a continuation of Ser. No. 212,599, filed June 28, 1988, all of which are now abandoned.

BACKGROUND OF THE INVENTION

The invention relates to couplings for non-ferrous pipe (or tubing) of plastic or fiberglass, for example. More particularly, the invention relates to glass reinforced resin pipe having premolded or contact molded end portions (male and female threads) for joining the end portions together.

Resin pipe reinforced with glass filamentous material is well known to the art and possesses a number of advantages over metal pipe, e.g., inertness, low weight, corrosive resistance, and high strength. These properties make such pipes particularly suitable for use in the chemical processing industry and in the oil industry for use as line pipe, down hole tubing, etc.

Threaded end portions of glass reinforced resin pipes have been formed by a number of methods. One method employs the use of discrete coupling members (bonded to the pipes) providing threaded adjacent ends to the pipes to be joined. However, since the adjacent ends of such pipes are joined by an interposed connector, the possibility for leakage is doubled. In addition, the time and effort necessary for assembly is increased as well as the possibility for damage during assembly.

The use of threaded pipe end portions is a considerable improvement over the employment of discrete coupling members. However, the formation of threaded end portions simultaneously with the formation of the pipe by virtue of a threaded coupling-like member over the end portion of a rotatable mandrel, for example, is also subject to some disadvantages. For example, care must be taken to avoid the entrapment of air in the resin in the formation of the threads and to assure uniform and complete filling of the threads. Thus, an extra step is introduced into the formation of the pipe. The application of release agents to the threaded nipple end must also be carefully applied to insure a good release of the thread and further to prevent any damage to the threads when the finished pipe is removed from the mandrel.

Another method involves scribing grooves in a finished pipe to form threads therein. Although this is a workable arrangement, it is not without drawbacks. The scribing procedure results in broken reinforcement threads and exposed fiberglass strands in the pipe. However, a joint having scribed grooves on the mating male and female members provides the distinct benefit of enhanced tensile strength in the area of the coupling when compared to coupling elements bonded or otherwise molded to the fiberglass pipe. In other words, the scribed grooves of a male/female coupling provide a direct mechanical interlock between the substrates of the joined pipes. Such pipes possess increased tensile strength in the coupling portion which corresponds to the relatively greater interlaminar shear strength of a scribed thread compared to a molded thread.

What emerges from the evolvement to date of fiberglass pipe male/female type couplings is a number of advantages and disadvantages associated with purely scribed grooves in the pipe on the one hand and paste threads contact molded to the pipe laminate on the other hand.

Scribed threads are ground into the pipe laminate and necessarily involve excess resin material (for the amount ground away). The grinding and scribing processes applied may involve broken or cut threads or exposed fiberglass strands and the potential rejection of the thread after the entire pipe has been formed. However, the ground or scribed male and female thread joint provides the distinct advantage of a mechanical interlock tied integrally to the pipe laminate. The interlaminar shear strength of ground threads is recognized to be relatively greater than that of paste or molded threads whereby the corresponding tensile strength of the joint is enhanced.

In regard to paste or contact molded threads formed on the pipe laminate ends to be joined, certain advantages and disadvantages also exist. The primary disadvantage resides in the fact that a paste or molded thread does not provide mechanical interlock between the joined pipe laminates because only an adhesive bond exists between the paste threads and the pipe laminate. However, the paste or molded threads provide a more consistent thread profile with a corresponding relatively smooth finish, resulting in relatively lower engagement, and more significantly disengagement, torque requirements. Furthermore, the paste or molded thread has less of a tendency to powder during engagement than does the relatively rough surface of a thread scribed into the pipe laminate material. Also, a paste or molded thread includes a more random orientation of reinforcement materials when compared to the reinforcement strands or threads which may be cut in the pipe laminate during grinding of a scribed thread. In other words, a random orientation of reinforcement materials with respect to the shear plane of the scribed threads results in a relatively stronger joint.

The above considerations are important in considering the application and use of the joint. For example, in an oil field situation utilizing a string of fiberglass pipes or tubes, it is obviously important that sufficient interlaminar shear strength exist at a joint. Put another way, it is important that the overall tensile strength of a pipe string not be unduly limited by potential separation of any one joint during use of the string. The tensile strength of the joints is also of significance in a horizontal pipe application. For example, a horizontal pipe typically will have a hydrostatic pressure associated with it which develops an end load on a pipe string which in turn exerts a tensile force on the pipe joints in an axial direction. In short, the tensile or axial force considerations in both a vertical and horizontal pipe string are the same with respect to the present invention.

SUMMARY OF THE INVENTION

The present invention provides for scribed or ground male and female threads on adjacent ends of two fiberglass pipe sections to be joined. At least one of the scribed threaded surfaces has a paste thread contact molded thereon so that the root or base of the paste thread is below the crest of the ground thread to which it is molded. The pitch of the contact molded thread is the same as the ground thread to which it mates. Upon mating of the coupled pipe ends, the paste thread surface provides the advantages enumerated above while also providing a mechanical interlock between the pipe sections. Mechanical interlock results from the overlapped projections of the male and female threads ground into the fiberglass pipes. The paste thread may be provided on either the male or female portion of the coupling. Alternatively, within the scope of the present invention, a paste thread may be formed on both the male and female scribed portions of the coupling. In this embodiment, the root or base of the paste threads on each joint portion are below the crest of the ground threads to which they are molded. As a further alternative embodiment of the present invention, it is comprehended that the aforesaid paste thread on a fiberglass pipe could be directly joined with the mating end of a steel or metallic pipe having integrally ground threads. Although reference has been made throughout to fiberglass reinforced pipe, it is also to be understood that on carbon, polyester or other functionally equivalent fibers, in addition to the more traditional glass fibers could be used to reinforce the pipe resin within the scope of the present invention.

Accordingly, an object of the present invention is to provide an improved coupling for joined fiberglass pipe sections in the sense that the joint will have significantly improved tensile strength in an axial direction when compared to certain prior art couplings.

Another object of the present invention is to provide a fiberglass pipe coupling which includes enhanced tensile strength as referred to above and which further includes the benefits of a paste thread interface on the male/female coupling surfaces.

A still further object of the present invention is to provide the aforesaid coupling in a manner which can be easily made a part of the fabrication process for fiberglass pipe.

With these and other objects in view which will more readily appear as the nature of the invention is better understood, the invention consists in the novel construction, combination and arrangement of parts hereinafter more fully illustrated and claimed.

DESCRIPTION OF THE DRAWINGS

Similar reference characters designate corresponding parts throughout the several figures of the drawings.

DESCRIPTION OF THE INVENTION

Figure 1:
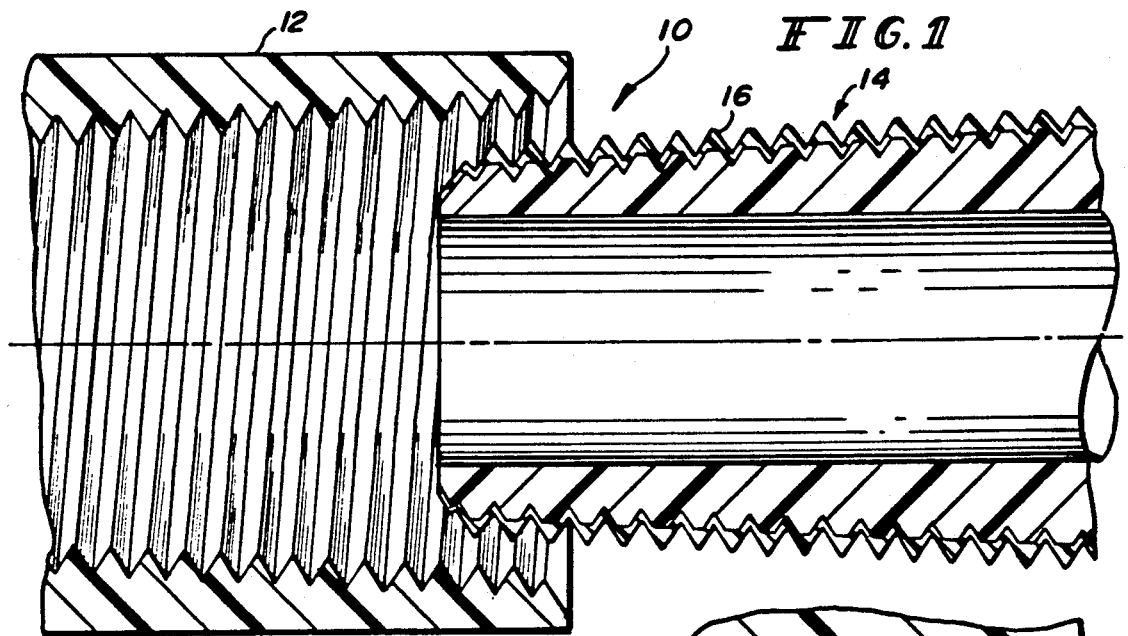
FIG. 1 is a longitudinal view in cross section of two fiber reinforced pipe ends having a male and female portion for coupling the same together. The female portion includes threads ground directly into the pipe laminate. The male portion has paste threads contact molded onto threads which are also scribed into the pipe laminate.

Pipe joint 10 in FIG. 1 is provided for connecting the ends of a pair of non-ferrous (e.g., fiberglass or plastic) pipe sections 12 and 14. The pipe sections have tapered ends as shown and correspondingly tapered male and female coupling portions. Each pipe section 12 and 14 is formed of resin including embedded strands of glass filaments (for example) for reinforcement purposes, as is well known in the art. As mentioned above, the reinforcement filaments could also be carbon, polyester or other functionally equivalent materials.

In the FIG. 1 embodiment, female threads are ground into the laminate body of pipe 12 and may, for example, have an eight round thread as is widely used in such fiberglass pipe applications. In the male pipe portion 14, threads are also scribed into the laminate body of the pipe and include a pitch corresponding to that on the female pipe coupling portion. The ground threads on pipe portion 14 are in turn provided with an overlying paste thread or contact molded thread 16 which includes the same pitch as the threads scribed into the resin pipe bodies. The contact molded thread 16 is preferably formed of the same resin that is used to fabricate pipe body 14. With the molded thread 16 bonded to pipe body 14, and both being formed of the same resin material, thermal expansion and contraction is easily accommodated since there is no rate differential. The paste thread 16 has filler material in it to control viscosity and chopped fibers to provide further reinforcement to the thread 16. The chopped fibers in the plastic thread 16 are randomly oriented as opposed to the wound reinforcement filaments in the fiberglass pipe bodies.

Figure 1A:
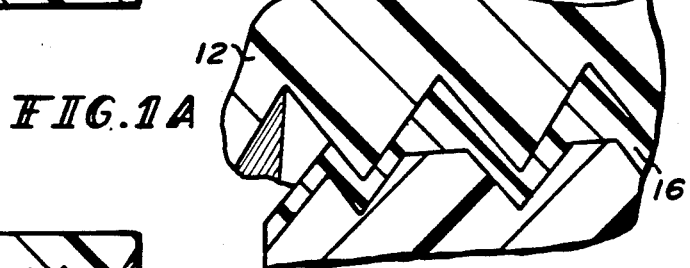
FIG. 1A is an enlarged, isolated view of the thread engagement illustrated in FIG. 1.

Upon engagement as illustrated in FIG. 1A, the crest of the threads scribed into each of the joined fiberglass pipes overlap one another and provide a mechanical interlock with the reinforced plastic thread 16 being sandwiched therebetween. This is a distinct advantage over the prior art structures which rely on the adhesion of a molded plastic thread to an underlying pipe body for tensile strength purposes. Preferably the ground threads are relatively shallow in order to minimize the cutting of the wound reinforcement threads or filaments in each of the pipe sections. Of course, in minimizing the cutting of the reinforcement threads in the pipe body, the reduction in reinforcement provided to the pipe body is minimized, and the wasted material of the pipe body due to grinding is minimized. With the engagement arrangement of the joint of the present invention, it is possible, therefore, to have an effective joint of enhanced tensile strength while minimizing the depth of the ground or scribed threads in the pipe body laminates.

In addition to the enhanced tensile strength characteristics of the coupling provided by the present invention, the provision of the contact molded thread surface provides for a more consistent, smooth thread engagement surface. This in turn translates into a relatively lower engagement and disengagement torque than would be the case, for example, if a ground thread were engaged with another ground thread. Of course, with a smoother thread surface, there is also a reduced tendency of the paste thread to powder or abrade when compared to the relatively abrasive surface of the ground thread if it were engaged with another ground thread.

Figure 2:
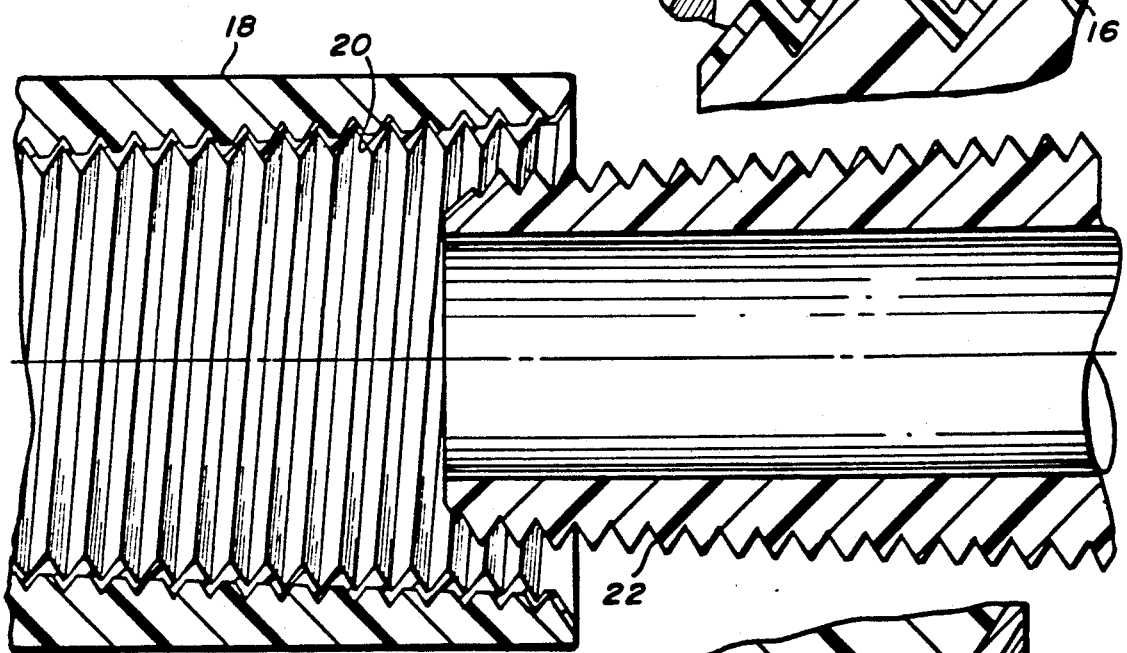
FIG. 2 is a view similar to FIG. 1 with the contact molded paste being placed on the female portion of the coupling instead of the male portion.
Figure 2A:
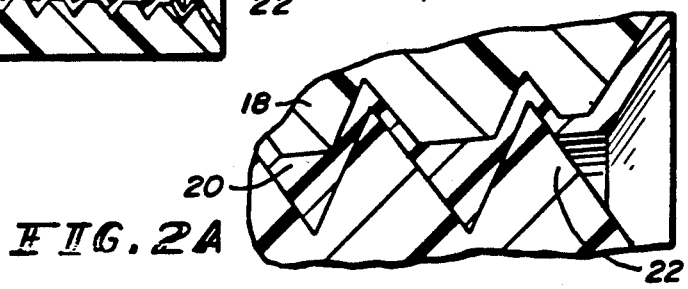
FIG. 2A is an enlarged, isolated view of the thread engagement illustrated in FIG. 2.

FIGS. 2 and 2A show another embodiment of the present invention with the female portion 18 of the joint having a contact molded thread surface 20 over the female threads ground into the pipe body 18. Correspondingly, the male pipe portion 22 only has threads ground into the pipe body. All of the same considerations applicable to the embodiment illustrated in FIGS. 1 and 1A apply to the embodiment illustrated in FIGS. 2 and 2A.

Figure 3:
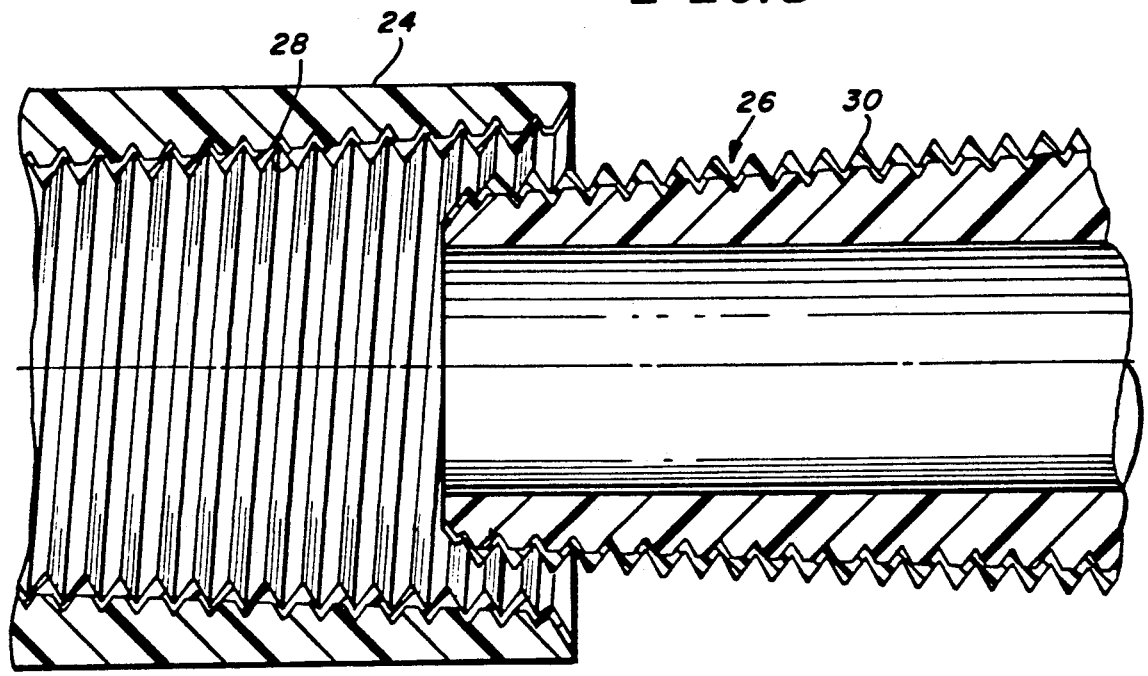
FIG. 3 is a longitudinal view in cross section of two fiber reinforced pipe ends having a male and female portion for coupling the same together. Each portion includes threads ground directly into the pipe laminate with paste threads contact molded to the threads into the respective pipe laminates.
Figure 3A:
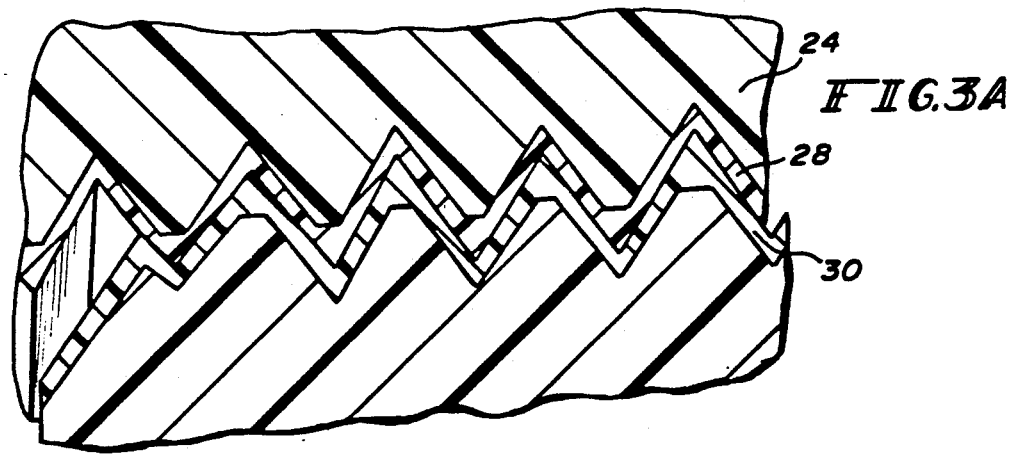
FIG. 3A is an enlarged, isolated view of the thread engagement illustrated in FIG. 3.

FIGS. 3 and 3A illustrate yet another embodiment of the present invention. In this embodiment, both the female pipe coupling portion 24 and the male portion 26 have threads of resin material molded to the threads scribed into the respective pipe bodies. The contact molded threads are designated at 28 on female portion 24 and at 30 on male portion 26.

The embodiment illustrated in FIGS. 3 and 3A would be used where relatively close thread tolerances are required and in difficult field applications for example where relatively lower engagement and disengagement torques might be desired. In addition, the FIG. 3 embodiment could be utilized when it is desired to have increased corrosion resistance since the molded paste thread surface is more effective in resisting corrosion than is the surface provided by threads scribed into the pipe body.

However, the FIG. 3 embodiment, as in the FIG. 1 and FIG. 2 embodiments, has as its principal advantage the mechanical interlock provided by the overlapping crests on the threads scribed into each of the coupled pipe bodies and the desirable characteristics associated with the contact molded thread surface as considered above.

Lastly, it is comprehended that a fiber reinforced pipe having a scribed thread end with a contact molded paste thread thereover (as described above) could be directly joined to a steel or metallic pipe end. The metallic pipe would have mating integrally ground threads whereby the mechanical overlap and associated benefits described above would exist.

What is claimed is:

1. A pipe made of resin reinforced with wound filaments, said pipe having an end portion suitable for making a connection exhibiting superior tensile strength to a female threaded member, comprising:
   male scribed threads cut into the exterior surface of said end portion of said pipe and having approximately the same pitch as the threads of said female threaded member, wherein said male scribed threads are cut to a depth sufficient to ensure that the crests of said threads on said female member overlap said crests of said male scribed threads after said pipe has been threadably attached to said female member, but not deep enough to cause significant cutting of said wound filaments and resultant reduction in the tensile strength of said connection;
   smooth contact molded threads made of resin overlying said scribed threads and having approximately the same pitch as said scribed threads, wherein said contact molded threads are sufficiently thin to ensure that the valleys of said contact molded threads extend below the crests of said scribed threads after said pipe has been threadably attached to said female member, and sufficiently thick to provide a consistent, smooth thread engagement surface, and wherein the resin of said molded threads is the same as the resin of said pipe, excluding said wound filaments therein, whereby said molded threads and said pipe have the same thermal expansion characteristics.

2. A pipe made of resin reinforced with wound filaments, said pipe having an end portion suitable for making a connection exhibiting superior tensile strength to a male threaded member, comprising:
   female scribed threads cut into the interior surface of said end portion of said pipe and having approximately the same pitch as the threads of said male threaded member, wherein said female scribed threads are cut to a depth sufficient to ensure that the crests of said threads on said male member overlap said crests of said female scribed threads after said pipe has been threadably attached to said male member, but not deep enough to cause significant cutting of said wound filaments and resultant reduction in the tensile strength of said connection;
   smooth contact molded threads made of resin overlying said scribed threads and having approximately the same pitch as said scribed threads, wherein said contact molded threads are sufficiently thin to ensure that the valleys of said contact molded threads extend below the crests of said scribed threads after said pipe has been threadably attached to said male member, and sufficiently thick to provide a consistent, smooth thread engagement surface, and wherein the resin of said molded threads is the same as the resin of said pipe, excluding said wound filaments therein, whereby said molded threads and said pipe have the same thermal expansion characteristics.

3. First and second pipes both made of resin reinforced with wound filaments, said pipes each having mating end portions suitable for making a connection exhibiting superior tensile strength, comprising:
   male scribed threads cut into the exterior surface of said end portion of said first pipe;
   mating female scribed threads cut into the interior surface of said end portion of said second pipe, wherein said male scribed threads and said female scribed threads both are cut to depths sufficient to ensure that their crests overlap after said first and second pipes have been threadably attached to each other, but not deep enough to cause significant cutting of said wound filaments and resultant reduction in the tensile strength of said connection; said female scribed threads having approximately the same pitch as the scribed threads of said first pipe;
   smooth contact molded threads made of resin overlying said scribed threads on both said first and second pipes and having approximately the same pitch as said scribed threads on said first and second pipes, wherein said contact molded threads are sufficiently thin to ensure that the valleys of said male and female contact molded threads extend below the crests of said male and female scribed threads, respectively, and sufficiently thick to provide a consistent, smooth engagement surface; and wherein the resin of said molded threads is the same as the resin of said pipes, excluding said wound filaments therein, whereby said molded threads and said pipes having the same thermal expansion characteristics.

4. A pipe made of resin reinforced with wound filaments having an end portion suitable for making a connection exhibiting superior tensile strength to a female threaded member, comprising:
   male scribed threads cut into the exterior surface of said end portion of said pipe and having approximately the same pitch as the threads of said female threaded member, wherein said male scribed threads are cut to a depth sufficient to ensure that the crests of said threads on said female member overlap said crests of said male scribed threads after said pipe has been threadably attached to said female member, but not deep enough to cause significant cutting of said wound filaments and resultant reduction in the tensile strength of said connection;

smooth contact molded threads made of the same resin as said pipe and reinforced with randomly-oriented chopped fibers, and containing a filler to control viscosity, overlying said scribed threads and having approximately the same pitch as said scribed threads, wherein said contact molded threads have the same thermal expansion characteristics as said pipe, as well as being sufficiently thin to ensure that the valleys of said contact molded threads extend below the crests of said scribed threads, and sufficiently thick to provide a consistent, smooth thread engagement surface.

5. A pipe made of resin reinforced with wound filaments having an end portion suitable for making a connection exhibiting superior tensile strength to a male threaded member, comprising:

female scribed threads cut into the interior surface of said end portion of said pipe and having approximately the same pitch as the threads of said male threaded member, wherein said female scribed threads are cut to a depth sufficient to ensure that the crests of said threads on said male member overlap said crests of said female scribed threads after said pipe has been threadably attached to said male member, but not deep enough to cause significant cutting of said wound filaments and resultant reduction in the tensile strength of said connection;

smooth contact molded threads made of the same resin as said pipe and reinforced with randomly-oriented chopped fibers, and containing a filler to control viscosity, overlying said scribed threads and having approximately the same pitch as said scribed threads, wherein said contact molded threads have the same thermal expansion characteristics as said pipe, as well as being sufficiently thin to ensure, and sufficiently thick to provide a consistent, smooth thread engagement surface.

6. First and second pipes made of resin reinforced with wound filaments having end portions suitable for making a connection exhibiting superior tensile strength, comprising:

male scribed threads cut into the exterior surface of said end portion of said first pipe;

female scribed threads cut into the interior surface of said end portion of said second pipe, and having approximately the same pitch as the scribed threads of said first pipe, wherein said male scribed threads and said female scribed threads both are cut to depths sufficient to ensure that their crests overlap after said first and second pipes have been threadably attached to each other, but not deep enough to cause significant cutting of said wound filaments and resultant reduction in the tensile strength of said connection;

smooth contact molded threads made of the same resin as said pipe and reinforced with randomly-oriented chopped fibers, and containing a filler to control viscosity, overlying said scribed threads on both said first and second pipes and having approximately the same pitch as said scribed threads, wherein said contact molded threads have the same thermal expansion characteristics as said pipes, as well as being sufficiently thin to ensure that the valleys of said contact molded male and female threads extend below the crests of said male and female scribed threads, respectively, and sufficiently thick to provide a consistent, smooth thread engagement surface.

* * * * *